S. O. MORSE.
DETACHABLE MEAT-HOOK.
No. 182,282. Patented Sept. 19, 1876.
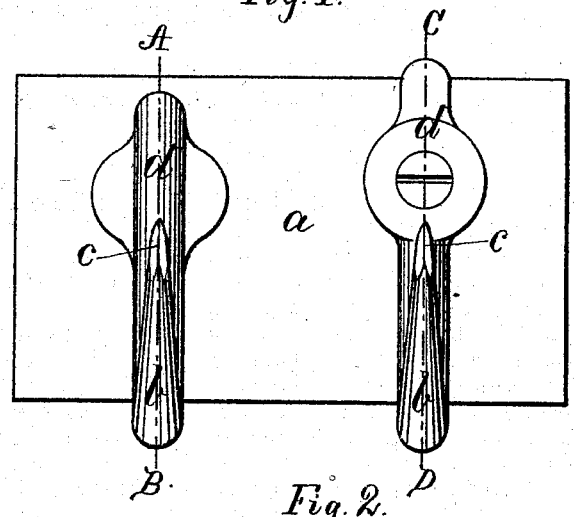
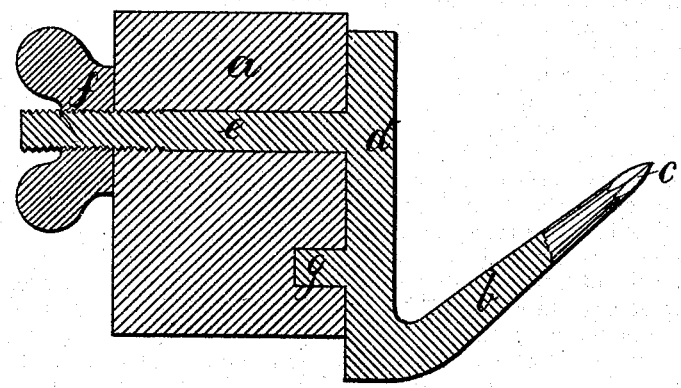
Witnesses:
Henry Chadbourn
Alonzo H. Roberts
Inventor:
Sargent O. Morse
by Alvan Andren
his atty.

UNITED STATES PATENT OFFICE.

SARGENT O. MORSE, OF BOSTON, MASSACHUSETTS.

IMPROVEMENT IN DETACHABLE MEAT-HOOKS.

Specification forming part of Letters Patent No. 182,282, dated September 19, 1876; application filed June 28, 1876.

*To all whom it may concern:*

Be it known that I, SARGENT O. MORSE, of Boston, in the county of Suffolk and State of Massachusetts, have invented certain new and useful Improvements in Detachable Meat-Hooks; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to improvements in meat-hooks for the purpose of suspending meats, poultries, &c.; and my invention consists of a metallic hook, provided with a straight plate-piece, having a screw made in one piece, or connected otherwise, to its upper end, which screw projects through a hole in the rack, and is secured on the rear thereof by means of a suitable thumb-nut, or its equivalent. Besides the projecting screw aforesaid, the plate-piece is provided near its lower end with a spur of suitable shape that fits into a corresponding recess in the face of the rack. The ends of these my improved hooks are diamond-pointed, by which the meat that is to be suspended thereon is more easily penetrated than if they were pointed conically, as of old.

The advantages of these my improved hooks over others now in use are that I am able to detach them in a very short time, and without the need of tools, from the rack for the purpose of cleaning or painting the latter. This is a great advantage over the ordinary stationary ones on account of the great facility by which the rack can be thoroughly cleaned all over or painted without the danger of hurting the hands of the operators. Another advantage is that these hooks are prevented from getting loose or wrenched to one side during use by the employment of the projecting spur in the lower end resting in a recess in the rack.

On the accompanying drawing, Figure 1 represents a front view of my invention, the right side of said figure showing a modification of my improved hook. Fig. 2 represents a longitudinal section on the line A B, shown in Fig 1.

Similar letters refer to similar parts wherever they occur on the different parts of the drawings.

$a$ represents the rack to which the meat-hooks are generally secured. $b$ represents the hook, provided with a diamond point, $c$, as and for the purpose specified. $d$ represents the vertical plate-piece, made in one piece with the hook $b$. It will be seen that this plate-piece $d$ has a bearing all over against the side of the rack $a$, by which arrangement great strength and firmness are obtained in the securing of the hook to the rack, or its equivalent. $e$ represents a shank or screw-rod, preferably made in one piece with the plate-piece $d$, and provided in its rear end with an external screw-thread, around which is fitted a thumb-nut, $f$, or its equivalent. The shank or screw-rod $e$ projects through a corresponding hole made in the rack $a$, as shown. Below the shank $e$ is made a projecting spur, $g$, in one piece with the plate-piece $d$, which spur rests in a corresponding perforation made in the side of the rack or beam. I prefer to make the diameters of the shank $e$ and spur $g$ the same, so that one single bit can be used for boring the requisite holes for the shank $e$ as well as for the spur $g$.

From the above it will be seen that these my improved hooks can easily be secured to a meat-rack and as easily detached when so required.

Having thus fully described the nature, construction, and operation of my invention, I wish to secure by Letters Patent, and claim—

The detachable meat-hook, as herein shown, consisting of the hook part $b$, plate $d$, spur $g$, and holding-screw, substantially as and for the purpose set forth.

In testimony that I claim the foregoing as my own invention I have affixed my signature in presence of two witnesses.

SARGENT O. MORSE.

Witnesses:
ALBAN ANDRÉN,
ALONZO H. ROBERTS.